United States Patent [19]

Benninghaus

[11] 4,174,199
[45] Nov. 13, 1979

[54] INJECTION-MOLDING TOOL

[75] Inventor: Hermann Benninghaus, Lüdenscheid, Fed. Rep. of Germany

[73] Assignee: HASCO-Normalien Hasenclever & Co., Ludenscheid, Fed. Rep. of Germany

[21] Appl. No.: 769,274

[22] Filed: Feb. 11, 1977

[30] Foreign Application Priority Data

Feb. 13, 1976 [DE] Fed. Rep. of Germany ....... 2605734

[51] Int. Cl.² .................................................. B29F 1/022
[52] U.S. Cl. .................................... 425/195; 164/339; 425/168; 425/451
[58] Field of Search .................... 425/182, 168, 450.1, 425/451, 195, 193; 100/295; 164/339; 269/285

[56] References Cited

U.S. PATENT DOCUMENTS

| 2,485,283 | 10/1949 | Guelph | 425/450.1 |
| 2,996,025 | 8/1961 | Georgeff | 100/295 |
| 3,402,431 | 9/1968 | Fogelberg et al. | 164/339 X |
| 3,596,317 | 8/1971 | Nicholson | 425/195 X |
| 3,743,463 | 7/1973 | Patrick et al. | 425/195 |

FOREIGN PATENT DOCUMENTS

| 570156 | 2/1959 | Canada | 425/195 |
| 831602 | 2/1952 | Fed. Rep. of Germany | 425/195 |

Primary Examiner—William R. Briggs
Attorney, Agent, or Firm—Montague & ross

[57] ABSTRACT

An injection mold has a pair of die plates upon which two mold parts are mounted and are mutually guided for relative movement. One of the mold parts comprises a pair of die jaws which are separable transversely to the direction of relative movement of the two mold parts with the jaws being guided on the respective die plate by guide assemblies disposed externally of the mold. Each guide assembly comprises a guide bar forming a groove in which a ridge of the jaws is slidable and which is affixed to a retaining bar so that the two parts abut one another in the plane of the junction of the mold part with its die plate. The retaining bar is fastened to the die plate and surfaces of the bars can be machined to compensate for wear.

9 Claims, 4 Drawing Figures 4,174,199

INJECTION-MOLDING TOOL

FIELD OF THE INVENTION

The invention relates to an injection-molding tool, particularly a mold, with two tool parts guided and interconnected by guide means and each constituted by mutually adjoining and centered tool elements, whereby one tool element, the mold plate, is provided with two relatively movable, centrally closing tool jaws one in front of the other and extending over the total mold width and each being guided on opposite sides by guide means provided laterally on opposite surfaces.

In injection molds having movable parts guided by guide means provided on the outer side of the mold, it is known to use as guide means relatively large-size guide plates formed such that they can also carry out control functions besides the actual guiding of the mold plate. For this purpose, transfer elements are provided between these guide plates and the movable mold parts which are in a position to assume individual control functions. As a consequence of their multifunction use, these previously known guide plates are specifically and individually made for an injection mold, so that they also can be used only individually the specific mold. Moreover, the cost of constructing and finishing control plates of this type is considerable.

OBJECT OF THE INVENTION

In contradistinction to molds equipped with guide plates as separate structural elements, it is the object of this invention to standardize the guide means of the mold parts and to make them structurally simpler and reduce their cost of fabrication, so that they can be used not only more universally but also for the compensation of wear caused by the movement of the mold parts for more reliable operation.

SUMMARY OF THE INVENTION

The object of the invention is attained in that each guide means is formed by a respective guide bar and a juxtaposed retaining bar, the guide bar having guide surfaces and/or guide recesses for a form-fitting guidance of the tool jaws at the level of the tool jaws and extending at least over part of the height thereof. The retaining bar lies at the level of the mold plate and extending over at least part of its height, being centered on the mold plate and detachably free-supporting thereon. Each guide bar is centered and held on the retaining bar and the retaining bar itself, on the side turned toward the mold plate and also in a plane transverse thereto on a side turned toward the guide bar, has machinable surfaces.

The externally provided guide means of the invention consist of elements which in their basic conception are so formed that they can be fabricated from bar-shaped portions of the same cross-section. Guide bars as well as retaining bars of the same configuration can be produced from such starting sections, so that essentially standardized structural elements result which, by maintaining their uniform basic shape, not only can be used for a series of molds of different sizes but moreover are combined in a meaningful way to a common attachment unit and can be easily assembled and mounted and, in case of necessity, just as easily removed from their working position on the tool. This more or less uniform configuration makes it is possible for the guide assembly to be used universally for a whole series of molds of different size. A prerequisite for this, however, is that that individual mold parts, in particular the tool jaws in the region of their guide means, as well as the mold plate in the region of attachment of the guide means, also are of standardized construction. The height, particularly of the mold plate and tool jaw, is unimportant.

The compensation for abrasion is feasible with the of the invention because, by the arrangement of machine ground surfaces in two planes lying transverse to one another, the height play caused by abrasion can be compensated by grinding and the side play can be removed in the same way.

With the system of the invention one can, with increasing abrasive action between the parts and the cam groove, for example, speak of a real cross-section decrease while, depending upon the degree of wear at the guide bar, a so-to-speak cross-section excess develops at the retaining bar which, in order to balance the abrasion or to readjust the guide unit to the mold part, will be removed, for example, by grinding.

It is essential for the invention that both the guide parts of the tool jaws in the receiving area of the guide recesses on the guide-bar side and the centering means between the parts to be centered cooperate with a certain slack adjustment in the corresponding counter receiving member, so that on the remounting of the guide means following the aftertreatment, the centering means will have sufficient space for readjustment so as to make reworking of the centering means unnecessary.

Another important feature of the invention is that the guide bars and the retaining bars in the plane of the contact line between the mold plate and the tool jaws lie flush with one another, whereby the guide bar has on its side a guide recess open towards the retaining bar for receiving a guide rib provided on the side of the tool jaw which is being guided.

This characteristic arrangement of two-part guide means allows, in practice, the grinding only of one single structural unit, particularly viewed in the retaining bar. Should a height play have to be compensated, it is merely required to carry out the aftertreatment grinding on the aftertreatment surface located between the guide bar and the retaining bar. In contradistinction hereto, any side play can be compensated by performing the grinding on the aftertreatment surface between the retaining bar and the mold plate. Consequently, it is possible to compensate for abrasion occurring at two surfaces lying transverse to one another.

It is also possible to carry out the machining not only on the aftertreatment surfaces of the retaining bar but rather over the entire tool jaw as well. It is pointed out that any play in the height direction, could also be compensated for by the machining of an aftertreatment surface of the cam groove. The two guide means located in the plane of the contact line between the tool jaws and the mold plate permits any required aftertreatment to be carried out only on one structural element, which is highly advantageous.

The guide assembly, according to the invention, is also particularly favorable for handling because both interconnected functional elements are held by means of common holding screws on the mold plate. This means that one can assemble the entire guide assembly as an attachment to the tool or for removal as a unit therefrom.

To ensure a mounting position of the guide bar and retaining bar under one another as well as the maintenance of an identical attachment installation of the guide unit on the tool, the system of this invention provides centering means between the construction elements themselves as well as between the attachment unit and the mold plate. Advantageously, these centering means are formed by strip-like construction elements formed, if possible, in such a way that—exactly like the guide bar and retaining bar—they also can be constituted from the same profile sections, so that the centering strips essentially are standardized structural elements. This means that all construction elements required for the construction of the guide assembly are standardized construction elements and the guide assembly as a unit is an essentially standardized and universally installable unit.

In this construction unit the grinding of at least one of these construction elements, particularly the retaining bar, for the purpose of abrasion compensation is possible because—and this is equally important to the invention—both the tool-jaw side guide means reaching into a guide between the guide bar and the retaining bar and the centering strips at times reach only so deep into the required counter recess as to leave a certain play with respect to the depth of penetration which will become constantly smaller upon grinding.

The guide assembly of the invention has the advantage that it allows compensation of both height and side play caused by wear between the tool jaws and the guide bar, merely by the grinding of only a single element on two surfaces lying transversely to one another. The assembly can be fabricated by simple steps, so as to reliably compensate any wear so that the operating condition of such tools can be maintained with simple means easily and effortlessly. The structural standardization, the configuration enabling easy manipulation and the possibility of highest and most accurate adaptation of the guide means to the actual wear are crucial advantages combined in the invention.

BRIEF DESCRIPTION OF THE DRAWING

An embodiment of the invention is shown in the accompanying drawing in which.

SPECIFIC DESCRIPTION

Figure 1:
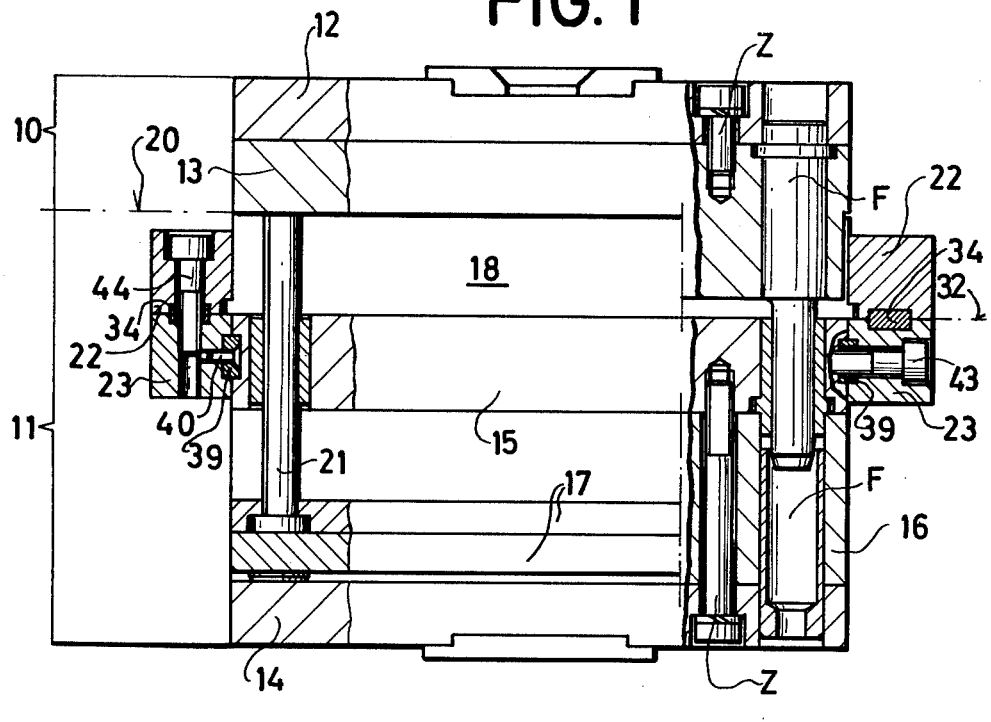
FIG. 1 is a transverse section along line I—I of FIG. 2 of a mold provided with a guide assembly according to the invention.

The injection mold represented in the drawing deals with the so-called jaw die. The construction of such a tool is best seen from FIG. 1. The die plate shown there has tool parts 10 and 11. Tool part 10 constitutes the so-called injection side. Tool part 11 represents the so-called ejector side. Both tool parts 10 and 11 are slidably interconnected by guiding means F, i.e. guide bolts and guide sleeves. Both tool parts are each composed of plate-shaped tool elements held together by centering and connection means Z.

Tool part 10 has a clamping plate 12 connected to a mold plate 13 in the present embodiment. Tool part 11 also has a clamping plate 14. Between this clamping plate and a mold plate 15 of the ejector side are spacer bars 16. In the region between spacer bars 16 there is an ejector unit 17 provided with ejector means—not shown—. Apart from this mold plate 15 has two relatively slidable tool jaws 18 which, in the region of a central separating line 19 in the closed position are disposed one in front of the other. Both tool parts 10 and 11, on the contrary, in the region of a common mold split 20, abut one another in the closed position.

In other words, plate 13 and the two-part mold "half" 18 define the mold cavity with the split at 20 while the members 18 are also separable at the split 19.

The ejector unit 17 has two back-pressing pins 21 penetrating mold plate 15 and which—since they are located in the region of the parting line 19 of the tool jaws 18—center them. The back-pressing pins 21 extend to mold plate 13 and have the task to return the ejector unit to its position as shown in FIG. 1 when the mold closes.

Figure 2:
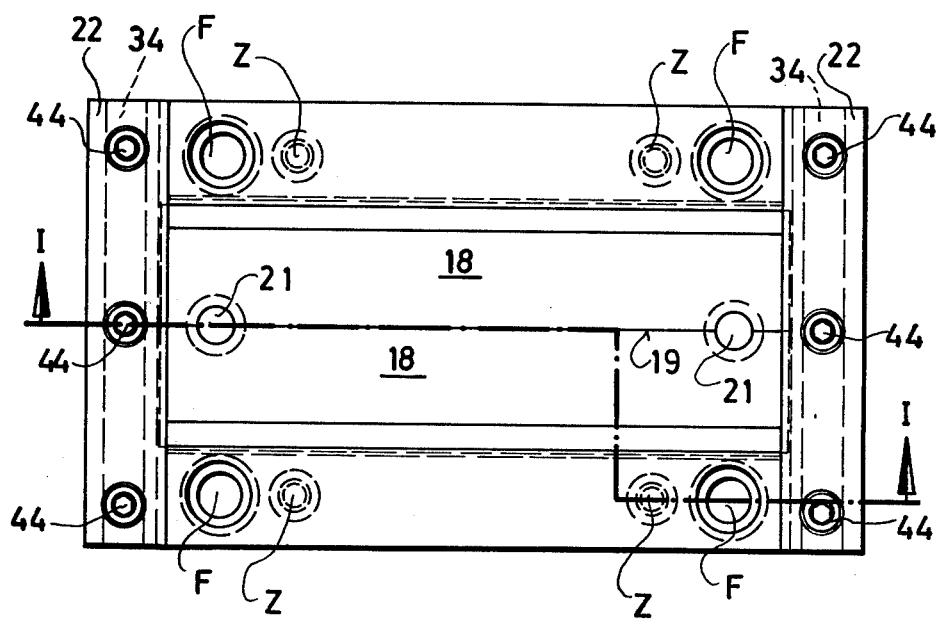
FIG. 2 is a plan view of merely the output or ejector side of the mold.
Figure 3:
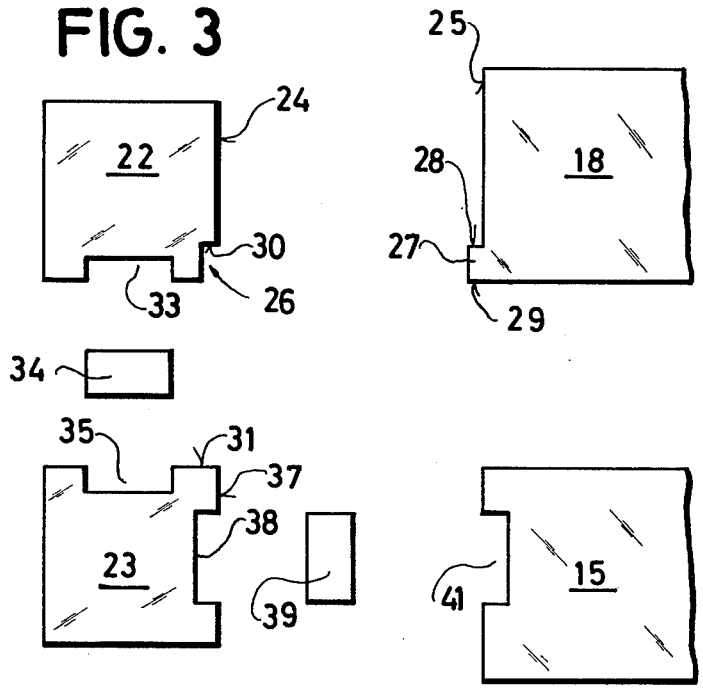
FIG. 3 is an exploded view of the guide assembly and the associated mold components in elevation.

The mold members 18 are guided on opposite external surfaces of the tool by external guide means. These guide means each include a guide bar 22 and a retaining bar 23, on the other hand, which will be described in greater detail. These guide means 22, 23 extend over the entire length (height) of the tool (see FIG. 2). The guide means are described in detail in connection with FIGS. 3 and 4.

Both the guide bar 22 and also the retaining bar 23 have essentially rectangular basic cross sections and are uniformly formed of the same initial cross-section. The guide bar 22 is provided on its side facing the tool jaws 18 with a guide surface 24, coacting with a counter surface 25 of the tool jaws 18. The guide bar 22 has on its side facing the retaining bar a guide step 26 into which a laterally protruding guide rib 27 from the opposing tool jaw 18 reaches in a form-fitting manner, so that guide edges 28 and 29 of rib 27 support themselves on shoulder 30 of the guide step 26 as well as on the contact surface 31 of the retaining bar. The guide unit is placed on the tool in such a way that the contact surfaces between both grooves coincide with the contact plane 32 between tool jaws 18 and mold plate 15.

On the side of the guide bar 22 facing retaining bar 23 is provided an essentially channel-shaped centering recess 33, which serves to hold a centering strip 34. This centering strip 34 has an elongated rectangular cross-section and extends over the entire length of the guide unit. It engages in a form-fitting manner with the centering recess 33. This means that it abuts at the bottom of the recess as well as on the side surfaces delimiting said recess.

Retaining bar 23, at a location corresponding to that of centering recess 33, is also provided with such a centering recess 35, into which centering strip 34 reaches only so deeply as to leave a free space 36 between itself and the bottom of the centering recess 35, the depth of which is decisive for the play adjustment. This can be seen in FIG. 4. Retaining bar 23, has in its contact surface 37, facing mold plate 15, a further centering recess 38, also capable of receiving a centering strip 39 in a form-fitting manner. This centering strip 39 of exactly the same size as that of centering strip 34, can be mounted with the aid of fastening bolts 40 (FIG. 1). Corresponding to this centering recess 38, a centering recess 41 is also provided in mold plate 15. Centering strip 39 reaches into this centering recess 38 only so far as to leave a free space 42 for play adjustment. This is equally well recognizable in FIG. 4.

The cantilevered guide assembly unit is held on the tool surface by holding bolts 43 which transversely traverse retaining bar 23, whereby these clamping bolts reach into mold plate 15. The guide bar 22 is held on the retaining strip 23 by holding bolts 44 which penetrate the guide bar and the centering strip 34 provided between the guide bar and the retaining bar. Slotted-hole openings 45 are provided which in practice serve to attach coolant connecting fittings to the tool. It permits these fittings to reach through the guide bar without difficulties.

At the retaining bar, both the contact surface 31 facing the cam groove and contact surface 37 facing the mold plate 15, constitute aftertreatment grindable surfaces. Any required aftertreatment grinding upon manifestation of wear is carried out exclusively on these surfaces. The machining of aftertreatment surfaces 31 and 37 should be understood to mean the removal, on these locations, of a layer corresponding to the degree of abrasion[wear]. Thus, on remounting the centering strips 34 and 39 penetrate even deeper into the centering recesses 35 and 31 which is possible because of the existing adjustment play 36 and 42. Likewise, the guide rib 27 of the tool jaws can, corresponding to the wear, penetrate even more deeply into the guide step 26, because here too an adjustment play 46 (FIG. 4) exists. The adjustment play 36 and 42 comes about because the common depth of penetration of the recesses 33 and 35 as well as 39 and 41 is larger than the total cross-section thickness of the centering strips 34 and 39.

Figure 4:
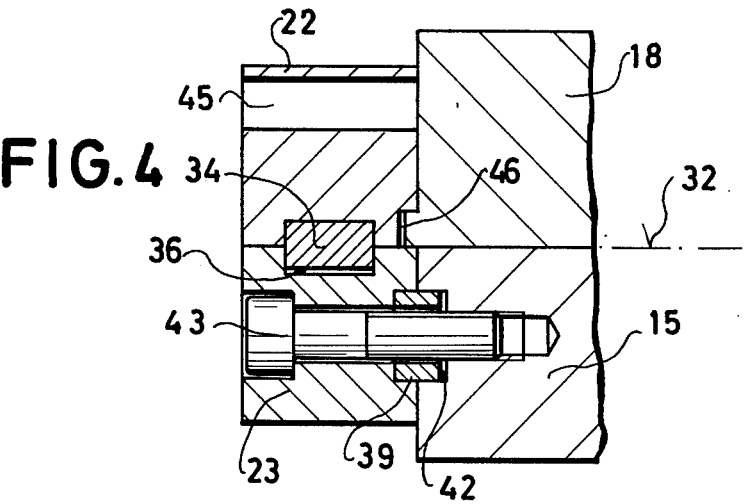
FIG. 4 is a detailed sectional view of the mounted guide assembly on the mold represented in true scale.

It can be seen, particularly from FIGS. 1 and 4, how the mounting of the guide unit as well as the guide means for the unit serving to guide the tool jaws concentrate in the region of contact line 32 between tool jaws and mold plates as well as guide rib 27 of the tool jaws 18, so that merely this area is decisive for the mounting. For the universal use of the guide-means unit for tools of different sizes this means that this area has to be formed as shown in the drawing. Consequently, the guide-means unit can be used for tools of different sizes maintaining its shape and size.

If, in the embodiment shown, a height or side play occurs as a result of wear in the guiding zone, this signifies that, as seen from the guide bar, in comparison with same, the reduced cross-section of the guide bar caused by abrasion wear on the retaining bar shows a certain cross-section excess which, through machining of the aftertreatment surfaces 31 and/or 37 is removed for purposes of wear compensation.

I claim:
1. An injection mold comprising:
   a first and a second die plate spacedly juxtaposed with one another and parallel to one another;
   a first mold part on said first die plate and a second mold part on said second die plate, said mold parts defining a mold cavity in a closed position of the mold;
   guide sleeves on one of said plates and guide bolts on the other of said plates extending transversely to a mold split between said mold parts and slidingly engaging for guiding the mold parts for relative displacement in a direction parallel to said guide bolts and sleeves, one of said mold parts comprising a pair of jaws relatively displaceable transversely to said direction on the respective die plate; and
   respective guide means disposed along opposite exterior sides of the mold for guiding said jaws, each of said guide means comprising:
   a retaining bar laterally affixed to said respective die plate with a surface flush with the joint between said jaws and said respective mold plate,
   a guide bar affixed to said retaining bar and having a surface bearing upon of said retaining bar while forming therewith a groove slidably receiving a lateral rib on said jaws, said guide bar having a further surface bearing laterally upon said jaws, and
   key means between said bars for form-fittingly connecting said together over their entire lengths.

2. The injection mold defined in claim 1 wherein said groove receives said rib with play whereby machining of said further surface to compensate for wear reduces said play.

3. The injection mold defined in claim 1 wherein said bars are of substantially rectangular cross section and the engaging surfaces of said bars are formed with a registering groove receiving centering strips form-fittingly connecting said bars together.

4. The injection mold defined in claim 3 wherein said strip is received with play in said registering grooves whereby machining of one of the mutually engaging surfaces of the bars reduces said play to compensate for wear.

5. The injection mold defined in claim 1 wherein said retaining bar and said respective die plate are formed with mutually registering grooves receiving a retaining strip of restangular cross section for form-fittingly connecting said retaining bar to said respective plate over the entire length of said retaining bar.

6. The injection mold defined in claim 5 wherein said strip is received with play in the registering grooves whereby grinding of the surfaces of said retaining bar confronting said respective plate to compensate for wear reduces said play.

7. The injection mold defined in claim 6 wherein said retaining bar is held onto said respective plate by bolts traversing said strip.

8. The injection mold defined in claim 1 wherein said guide bar is held on said retaining bar by bolts traversing the mutually engaging surfaces of said bars.

9. The injection mold defined in claim 1 wherein said guide bar is formed with at least one elongated opening adapted to receive a pipe fitting engaging said one of said mold parts.

* * * * *